United States Patent [19]

Schindel et al.

[11] Patent Number: 4,949,920
[45] Date of Patent: Aug. 21, 1990

[54] ABLATIVE COOLING OF AERODYNAMICALLY HEATED RADOMES

[75] Inventors: Leon H. Schindel, Rockville; Richard T. Driftmyer, Bowie, both of Md.

[73] Assignee: The United States of America as represented by the Secretary of the Navy, Washington, D.C.

[21] Appl. No.: 450,754

[22] Filed: Dec. 14, 1989

[51] Int. Cl.$^5$ ............................................. B64C 1/38
[52] U.S. Cl. ................................ 244/117 A; 244/121
[58] Field of Search ................. 244/121, 117 A, 158 A

[56] References Cited

U.S. PATENT DOCUMENTS

| | | | |
|---|---|---|---|
| 3,138,009 | 6/1964 | McCreight | 62/315 |
| 3,731,893 | 5/1973 | Stalmach, Jr. | 244/160 |
| 3,785,591 | 1/1974 | Stalmach, Jr. | 244/163 |
| 3,883,096 | 5/1975 | Osofsky | 244/117 A |
| 4,173,187 | 11/1979 | Steverding | 250/515.1 |

*Primary Examiner*—Charles T. Jordan
*Assistant Examiner*—Rochelle Lieberman
*Attorney, Agent, or Firm*—Kenneth E. Walden; Jacob Shuster

[57] ABSTRACT

A radome type nose cone shell subjected to aerodynamic heating during projectile travel, is ablatively cooled by evaporation of metal coolant from a solidified coating thereof adhering to the external surface of a porous section of the cone shell through which the coolant seeps from internal storage at a rate regulated by formation of the solidified coating. The evaporating coolant from the coating mixes with the air in the flow stream to form a protective a boundary layer extending downstream from the porous section of the nose cone shell. The coolant is melted by said aerodynamic heating during internal storage within the nose cone shell for seepage outflow from the porous section and has the requisite heats of vaporation and fusion to effect alternate freezing and thawing thereof in response to withdrawal of heat by the cooling process for establishment and maintenance of the flow regulating coating.

20 Claims, 2 Drawing Sheets

ABLATIVE COOLING OF AERODYNAMICALLY HEATED RADOMES

BACKGROUND OF THE INVENTION

This invention relates generally to the cooling of surfaces aerodynamically heated by flow of air relative thereto, and more particularly to the cooling of radiation transmissive nose cone surfaces of missiles having properties adversely affected by aerodynamic heating during air travel at high velocities.

Because of associated weight problems, internal cooling of missile nose cones by recirculating coolant processes to cope with aerodynamic heating has not been found satisfactory. Cooling by external flow of coolant in transpiration and/or ablative processes is therefore preferred. The transpiration cooling process involves loss of the coolant from a protective boundary layer established on the external surface of the nose cone during missile travel for the purpose of absorbing heat, reducing skin friction or decreasing heat transfer. The ablative cooling process heretofore involved absorption of heat on the external surface of the nose cone by melting of surface material which is lost by either evaporation or sublimation.

Cooling of an aerodynamically heated missile nose cone by a self-contained, adaptive transpiration (SCAT) process has heretofore been demonstrated in an unclassified and limited distribution report dated Jan. 10, 1976, prepared for the Naval Surface Warfare Center, at White Oak, in Silver Spring, Md., entitled "Development of SCAT Nose Tip Concept for Advanced Reentry Vehicles", by I. M. Grinberg et al. According to the foregoing report, a melting metal coolant stored internally within the nose cone was injected through a porous tip portion of the cone shell into an ablative protective boundary layer externally established on the nose cone surface in overlapping relation to an upstream heat shield portion of the nose cone to provide erosion resistance by heat absorption. Such SCAT process was successfully demonstrated, according to the report, in connection with a nose cone shell made of molybdenum and a coolant metal in the form of thallium.

In connection with missile nose cones that function as a radome, additional cooling problems are introduced because of the structural and thermal properties of the radome shell material and the adverse effect of transpiration cooling on the radiation transmissive property of such shell. As to cooling by ablation the geometry altering effect of such process on the nose cone shell causes signal distortion.

Radome materials transparent to radar signal are unable to withstand aerodynamic forces at the elevated temperatures produced by aerodynamic heating in the absence of cooling. Nose cone radomes associated for example with infrared detecting equipment are even more sensitive to aerodynamic heating because radiation from a hot window can mask the target or saturate the detector.

Accordingly, it is an important object of the present invention to provide for cooling of radome surfaces in a beneficial manner, as in the case of transpiration and ablative processes aforementioned, while maintaining the radome geometry constant and avoiding excessive modification of the radiation transmissive property of the radome material.

A further object of the present invention in accordance with the foregoing object is to provide adequate cooling for a missile carried radome despite its relatively fragile shell construction.

SUMMARY OF THE INVENTION

In accordance with one embodiment of the present invention, the shell of a missile carried radome, having a suitable thickness and made of a solid material, is provided with porous portions made of a higher melting point metal, such as a steel alloy, through which a coolant liquified by aerodynamically generated heat is injected into the air flow stream for mixing therewith and forming boundary layers on the external surface of the solid shell downstream of the porous portions during missile travel. The coolant is a metal, such as copper, stored in a solid state within the nose cone so as to be liquified by the aerodynamically generated heat conducted through the walls of the shell in order to intermittantly seep through the porous portions at an automatically regulated flow rate. The heats of vaporization and fusion of the coolant are such as to cause freezing of the coolant into a solidified, flow regulating coating adhering externally to the porous portions from which the coolant is vaporized to mix with air within the boundary layers thereby established and maintained on the external shell surface. The thawed coolant evaporating from its flow regulating coatings into the protective layers is replaced by the aforementioned seepage type of regulated outflow from the stored bodies of the coolant metal in thermally conductive contact with the porous sections of the cone shell. Because of the cyclic exchange of energy involved in the vaporization of the coolant and the associated loss of heat from the storage mass of coolant underlying the porous sections, the flow regulating coatings are confined to the porous sections of the cone shell.

According to certain embodiments of the invention, one of the porous sections of the shell is formed at its cone tip from which one of the protective boundary layer extends downstream along a relatively non-porous section thereof to an extent limited by formation of another porous section in the form of an annular band portion of the shell. The heat transfer rates through the protective boundary layers resulting from the regulated inflow of the metal coolant decrease linearly in downstream directions with corresponding downstream increases in temperature so that the dimensionally limited extent of such protective boundary layers effectively lower the temperature of the entire radome to acceptable levels.

BRIEF DESCRIPTION OF THE DRAWINGS

A more complete understanding of the invention and many of the attendant advantages thereto will be readily appreciated as the same becomes better understood by reference to the following detailed description when considered in connection with the accompanying figures wherein.

DETAILED DESCRIPTION OF THE PREFERRED EMBODIMENT

Figure 1:
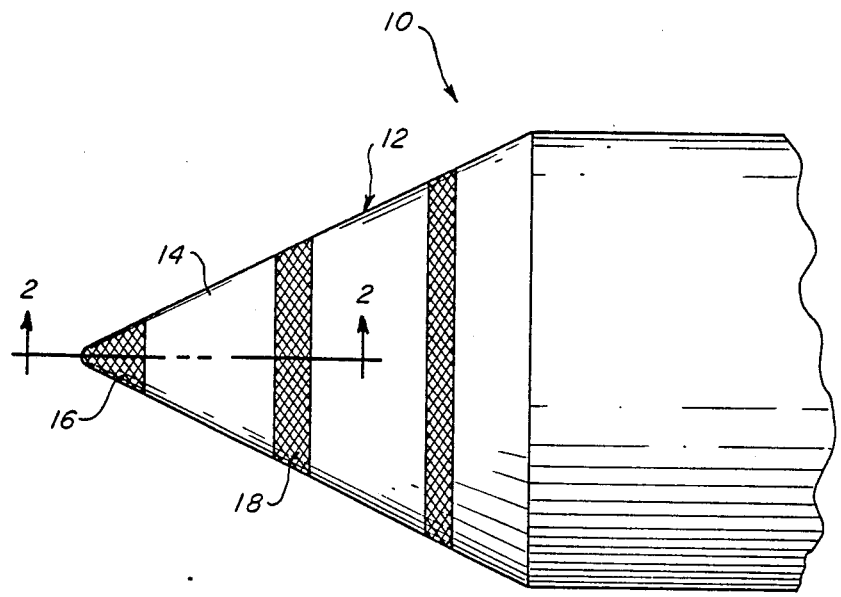
FIG. 1 is a partial side elevation view of a missile having a radome nose cone constructed in accordance with one embodiment of the present invention.
Figure 2:
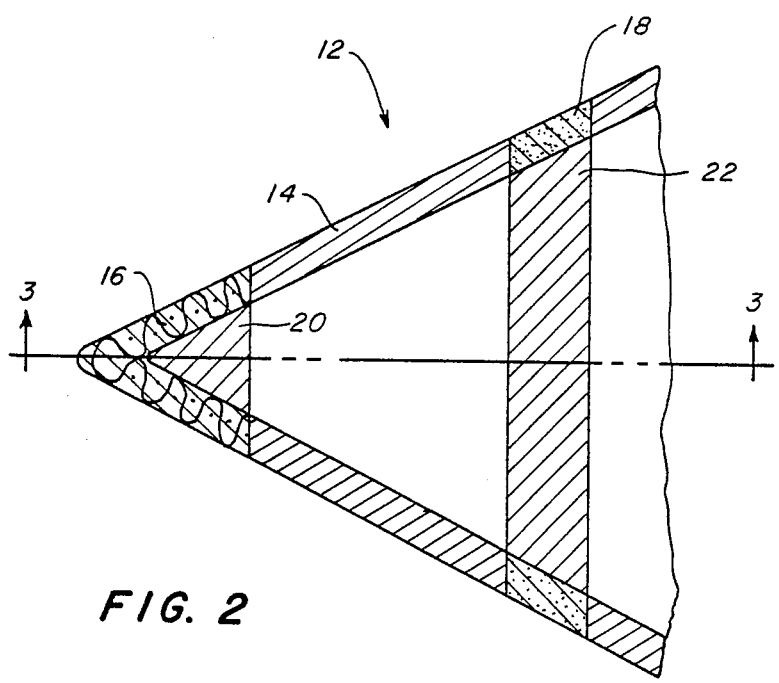
FIG. 2 is an enlarged section view taken substantially through a plane indicated by section line 2—2 in FIG. 1.

Referring now to the drawings in detail, FIGS. 1 and 2 illustrate a typical missile 10 having a radome type of nose cone generally referred to by reference numeral 12. The body of the radome nose cone is made of a solid pyroceram shell 14 adapted for atmospheric travel at 50,000 feet elevation and at velocities up to Mach number 8. Under such travel conditions, the adiabatic wall temperatures acquired by the shell 14 for a 12.5° conical radome is approximately 5000° R with a surface pressure of about 9.58 psia. As is known in the art, conical radome shells are radiation transmissive by reason of which the shell 14 is relatively thin and fragile, as compared to missile nose cone shells in general, and require cooling in order to survive under the aforementioned travel conditions.

In accordance with the present invention, the radome nose cone 12 has a porous tip portion 16, made of a steel alloy having a higher melting point than the solid shell 14. One or more porous annular band portions 18 are also formed in the radome nose cone, spaced downstream from the tip portion 16 as shown. The porous tip and annular band portions 16 and 18 enclose within the nose cone 12 separate storage masses 20 and 22 of a coolant, as shown in FIG. 2. The porous tip and band portions 16 and 18 and the coolant masses 20 and 22 constitute the cooling means for the randome nose cone which is automatically operative under the missile travel conditions aforementioned to provide the requisite cooling protection in such a manner as to avoid both geometric alteration of the nose cone and signal distortion causing unacceptable interference with radiation propagation through the solid shell 14 of the radome nose cone.

In order to achieve the foregoing objectives of the invention, the coolant material stored at 20 and 22 is liquified or melted at temperatures produced by the heat aerodynamically generated during missile travel. Other necessary properties of the coolant include heat of vaporization sufficiently greater than its heat of fusion to cause withdrawal of enough heat therefrom to effect freezing of the coolant to a solid state coating adhering to the external surface of the porous portions 16 and 18 of shell 14. Still other necessary properties of the coolant include an acceptable level of interference of the coolant in its vapor phase with radar signals, a high specific heat, a high melting point lower than the level which maintains the radome geometry constant, high thermal conductivity, high density and generally non-hazardous properties. Based on the foregoing criteria, copper was chosen as the coolant in accordance with one embodiment of the invention.

The effectiveness of a metal coolant for ablative cooling of a missile nose cone by its injection, in a molten state, into the boundary layer formed on the external surface of the nose cone during travel, has already been successfully demonstrated as hereinbefore pointed out. Similarly, the external surface of shell 14 is cooled by the downstream effect of the melted coolant 20' and 22' seeping through the porous portions 16 and 18 from the storage masses 20 and 22 as shown FIGS. 3 and 4, to render the boundary layers 24 between the porous portions 16 and 18 as shown effective to produce the requisite cooling.

Figure 3:
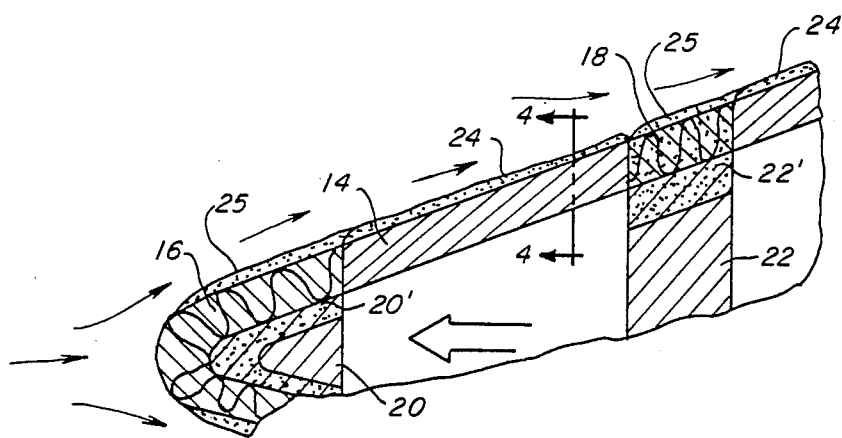
FIG. 3 is a partial section view taken substantially through a plane indicated by section line 3—3 in FIG. 2, showing a portion of the radome nose cone during atmospheric travel of the missile.
Figure 4:
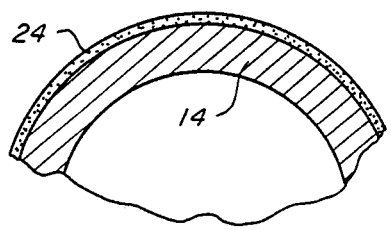
FIG. 4 is a partial section view taken substantially through a plane indicated by section line 4—4 in FIG. 3.
Figure 5:
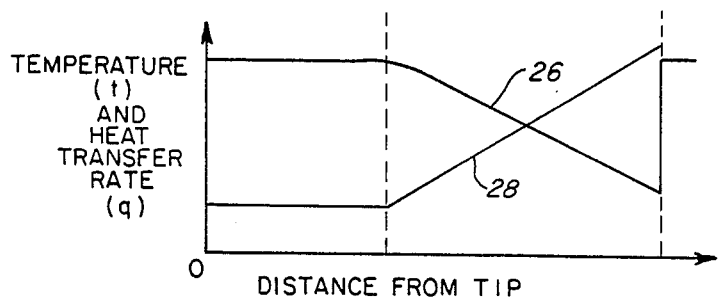
FIG. 5 is a graph showing typical heat transfer characteristics of the protective boundary layer depicted in FIGS. 3 and 4.

Based on experimental data obtained from wind tunnel testing of preliminary models, the cooling process involved in the illustrated embodiment of the present invention is assumed to be initiated by inflow of the coolant metal in its liquid phase, seeping through the porous portions of the radome nose cone, into the boundary layers 24. The heat of vaporization of copper as the coolant metal relative to its heat of fusion is large enough so that a cyclic exchange of energy occurs to cause solidification or freezing of the emerging liquid copper into coatings 25 adhering externally to the porous surface portions of the shell 14 from which the coolant thaws and evaporates into copper vapor mixing with the air within the layers 24 along a limited extent of relatively non-porous portions of the shell surface dictated by the axial spacing between porous portions 16 and 18. Regions of the layers 24 are thereby rendered heat conductive at a linearly decreasing heat transfer rate (q) and increasing temperature (t) as depicted by curves 26 and 28 in FIG. 5. Thus, the temperature (t) of the shell 14 underlying each protective layer 24 rises gradually in a downstream direction toward the adiabatic wall value. While aerodynamic heating melts, freezes, thaws and then vaporizes the coolant metal to form a mixture of air and coolant vapor within layers 24, the resulting loss of coolant metal is replaced by intermittent seepage through the porous portions 16 and 18 at an automatically regulated flow rate established by alternate freezing and thawing of the coolant to produce the heat transfer characteristics of the layers 24, as depicted in FIG. 5. The flow rate of coolant seepage through the porous portion 16 and 18 is thus controlled by the establishment of the coatings 25, as shown in FIG. 3, by virtue of the rate at which heat is withdrawn from the coolant under the travel conditions of the missile which call for protective cooling.

While the foregoing cooling process will introduce coolant vapor for mixing with the fluent medium or air within the protective boundary layers 24, in the case of copper as the coolant the vapor concentration is small enough to have little effect on transmission of radar signals through the solid portions of the shell 4. At adiabatic wall temperatures of the radome cone, of approximately 5000° R for example, the conductivity of copper ion concentration would be too small for short-out of such radar signals.

Obviously, numerous modifications and variations of the present invention are possible in light of the above teachings. It is therefore to be understood that within the scope of the appended claims the invention may be practiced otherwise than as specifically described herein:

What is claimed is:

1. In combination with a missile adapted to travel through a fluent medium at velocities during which aerodynamic heating thereof occurs, said missile including a shell made of a solid material having a geometry altering temperature, cooling means for preventing geometric alteration of the shell by said aerodynamic heating thereof in response to said travel of the missile, including a body of coolant having a melting temperature lower than the geometry altering temperature of the shell to accommodate melting of the coolant in response to said aerodynamic heating of the shell, porous means formed in the shell for inflow of the melted coolant into a protective boundary layer established externally on the shell during said travel of the missile, said coolant having a difference between heats of vaporization and fusion resulting in withdrawal of heat from the coolant during travel of the missile, and means storing the body of coolant in operative relation tot he porous means for establishing a solidified coating of the coolant adhering to the porous means externally of the shell upstream of the boundary layer in response to said withdrawal of heat from the coolant to regulate said inflow of the coolant into the boundary layer.

2. The combination as defined in claim 1 wherein said protective boundary layer acquires a heat transfer rate decreasing substantially linearly in a downstream direction from the porous means in response to said regulated inflow of the coolant.

3. The combination as defined in claim 2 wherein said body of the coolant including separate storage masses of the coolant respectively enclosed by the porous tip section and the annular porous band within the nose cone shell.

4. The combination as defined in claim 3 wherein said solid material of the nose cone shell forms a radome through which radiation is transmitted, said coolant being distributed within the protective boundary layers without unacceptable intereference with said transmission of the radiation.

5. The combination as defined in claim 4 wherein said coolant is metallic copper.

6. The combination as defined in claim 1 wherein said coolant is metallic copper.

7. In combination with a missile adapted to travel through a fluent medium at velocities during which aerodynamic heating thereof occurs, said missile including a nose cone shell made of a solid material having a geometry altering temperature, cooling means for preventing geometric alteration of the nose cone shell by said aerodynamic heating thereof in response to said travel of the missile, including a body of coolant having a melting temperature lower than the geometry altering temperature of the shell to accommodate melting of the coolant in response to said aerodynamic heating of the shell, porous means formed in the shell for inflow of the melted coolant into a protective boundary layer established externally on the shell during said travel of the missile, said coolant having a difference between heats of vaporization and fusion resulting in withdrawal of heat from the coolant at a predetermined rate during travel of the missile, and means storing the body of coolant in operative relation to the porous means for automatically regulating said inflow of the coolant into the boundary layer by formation of a solidified coating of the coolant adhering to the porous means in response to said withdrawal of heat from the coolant at the predetermined rate, the porous means including a tip section and an annular band section of the shell spaced downstream of the tip section.

8. The combination as defined in claim 7 wherein said solid material of the nose cone shell forms a radome through which radiation is transmitted, said coolant being distributed within the protective boundary layers without unacceptable intereference with said transmission of the radiation.

9. The combination as defined in claim 8 wherein the coolant is metallic copper.

10. In combination with a missile adapted to travel at velocities during which aerodynamic heating thereof occurs, said missile including a shell and cooling means for preventing geometric alteration thereof by said aerodynamic heating of the missile without adversely affecting transmission of radiation therethrough, comprising a body of coolant enclosed within the shell and porous means formed in the shell along a limited section thereof in heat conductive relation to said body of coolant for automatically regulating flow of the coolant melted by said aerodynamic heating into a protective boundary layer established externally on the shell downstream of said limited section during said travel of the missile.

11. The combination of claim 10 wherein said protective boundary layer acquires a heat transfer rate decreasing substantially linearly downstream from the porous means in response to said regulated flow of the coolant.

12. The combination of claim 10 wherein said coolant is copper.

13. The combination of claim 10 wherein said limited section of the shell, at which the porous means is located, is a tip portion made of a material having a higher melting point than that of the coolant.

14. In combination with a missile adapted to travel through atmospheric air at velocities during which aerodynamic heating thereof occurs, said missile including a radome shell and cooling means for preventing geometric alteration thereof by said aerodynamic heating of the missile without adversely affecting transmission of radiation therethrough, comprising a body of coolant metal enclosed within the shell and porous means formed in the shell for automatically regulating flow of the coolant metal melted by said aerodynamic heating into a protective boundary layer established externally on the shell during said travel of the missile, said protective boundary layer acquiring a heat transfer rate decreasing substantially linearly in a downstream direction from the porous means in response to said regulated flow of the coolant metal, said coolant metal being copper and said porous means including a tip portion of the shell made of a material having a higher melting point than that of the copper, said porous means further including an annular band portion of the shell spaced downstream of the tip portion, said protective boundary layer having separate sections respectively extending downstream from said tip and annular band portions.

15. In combination with a surface exposed to fluent medium in a flow stream at relative velocities which heat said surface to a geometry altering temperature level, cooling means for preventing elevation in temperature of said surface to the geometry altering temperature level, including a body of coolant having solid, liquid and vapor phases, porous means in said surface exposed to said fluent medium for conducting an inflow of the coolant into the flow stream and means storing the body of coolant in the solid phase thereof in heat conductive relation to the porous means for automatically regulating said inflow and vaporization of the coolant within the flow stream to establish a protective boundary layer therein along the surface downstream of the porous means, said boundary layer containing the coolant in the vapor phase mixed with the fluent medium.

16. The combination of claim 15 wherein said coolant has a predetermined difference between heats of vaporization and fusion enabling formation of a flow regulating coating of the coolant in the solid phase to effect said automatic regulation of the inflow of the coolant into the protective boundary layer.

17. The combination of claim 16 wherein the coolant in said flow regulating coating alternately freezes and thaws to supply the coolant in the vapor phase to the protective boundary layer producing a heat transfer rate therefor which decreases linearly in a downstream direction along the surface from the porous means.

18. The combination of claim 17 wherein said fluent medium is air, said surface is radiation transmissive and said coolant is copper.

19. The combination of claim 15 wherein said fluent medium is air, said surface is radiation transmissive and said coolant is copper.

20. In combination with a surface adapted to travel through a fluent medium, cooling means for preventing geometric alteration of said surface by aerodynamic heating thereof during travel, including a body of coolant and porous means of limited extend formed in the surface for regulating inflow of the coolant downstream into the fluent medium when melted by said aerodynamic heating to form a protective boundary layer externally on the surface during said travel thereof, said porous means including a tip section of the surface and an annular band section spaced downstream of the tip section.

* * * * *